Figure 1:
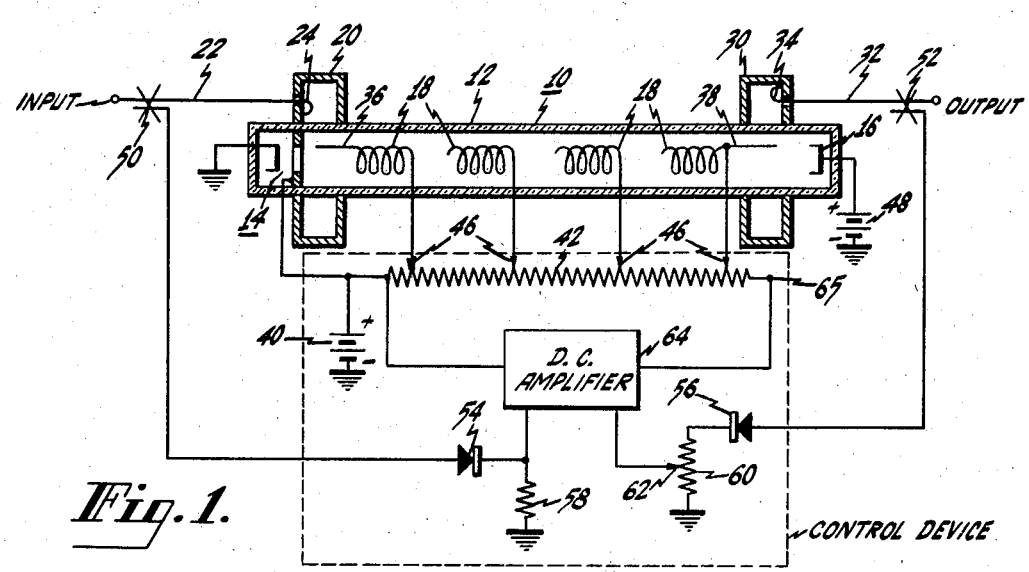

April 7, 1959   A. L. EICHENBAUM ET AL   2,881,349
CONTROL DEVICE
Filed May 23, 1957

INVENTORS
ARIE L. EICHENBAUM
BY & RONALD C. KNECHTLI

*Charles H. Brown*
ATTORNEY

United States Patent Office 2,881,349
Patented Apr. 7, 1959

2,881,349

CONTROL DEVICE

Arie L. Eichenbaum, Levittown, Pa., and Ronald Knechtli, Cranbury, N.J., assignors to Radio Corporation of America, a corporation of Delaware Application May 23, 1957, Serial No. 661,132

5 Claims. (Cl. 315—3.6)

The invention relates to a control device, and particularly to a control device for maintaining the power gain of a traveling wave tube substantially constant or for maintaining the power output of a traveling wave tube substantially constant, despite changes in the power input of the traveling wave tube.

An object of the invention is to maintain the power output of a traveling wave tube substantially constant in a novel manner, despite changes in the input power applied to the traveling wave tube.

Another object of the invention is to provide a control device for maintaining the overall power gain of a traveling wave tube substantially constant, despite changes in the input power applied to the traveling wave tube.

The control device of the invention is intended to be used primarily with a traveling wave tube having input means, output means, and wave-guiding means. The wave-guiding means of the traveling wave tube may be the conventional single helix, or may be a plurality of radio frequency coupled helices, such as described in the application of R. W. Peter entitled, "Traveling Wave Electron Tubes and Circuits," Serial No. 240,330, filed Aug. 4, 1951, now Patent No. 2,817,037, issued October 28, 1957. In accordance with the invention, the control device comprises first means for producing a first voltage proportional to the power of an output signal derived from the output of the traveling wave tube, and also comprises second means for producing a second voltage to be compared with the first voltage. The first and second voltages are compared by a comparator that produces a resultant voltage having a polarity and magnitude that is proportional to the difference between the first and second voltages. Means are coupled between the comparator and between the wave-guiding means for applying the resultant voltage to the wave-guiding means, this resultant voltage being a control voltage for the wave-guiding means. In one embodiment, the second means for producing the second voltage may be coupled to the input means of the traveling wave tube so that it produces a second voltage that is proportional to the power of an input signal applied to the traveling wave tube. This embodiment enables the control device to maintain the power gain of the traveling wave tube substantially constant despite variations in the power of input signals applied to the traveling wave tube. In another embodiment of the invention, the second means for producing the second voltage may be a reference voltage, such as a source of direct current or D.-C. potential. This embodiment enables the control means to maintain the power output of the traveling wave tube substantially constant despite variations in the radio frequency power of input signals applied to the traveling wave tube.

Figure 2:
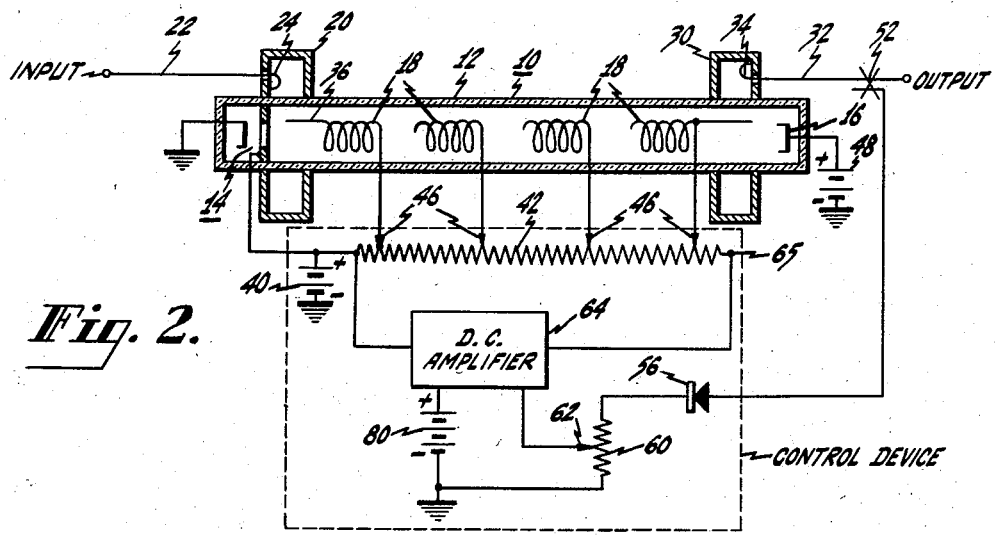

The invention is explained in detail in connection with the accompanying drawing, in which:

Fig. 1 shows a traveling wave tube and a control device in accordance with the invention for maintaining the power gain of the traveling wave tube substantially constant; and Fig. 2 shows a traveling wave tube and a control device in accordance with the invention for maintaining the power output of a traveling wave tube substantially constant.

In the figures, like reference numerals refer to like parts. Referring first to Fig. 1, a traveling wave tube 10 is shown in schematic form. The traveling wave tube 10 is enclosed in an evacuated envelope 12, and comprises an electron gun structure 14, which includes a cathode and an anode, an electron collector 16, and a plurality of wave-guiding means, such as the helices 18 shown, arranged end-to-end and spaced between the electron gun 14 and the collector 16. The helices 18 are shown spaced apart for clarity, but in an actual tube would be radio frequency coupled to each other in accordance with conventional practice. The electrons emitted by the gun 14 pass thru the interiors of the helices 18 in succession. Radio frequency signals may be applied to the traveling wave tube thru an input cavity device 20, such a device being described by Pierce in Pat. No. 2,636,948, issued April 28, 1953. The input radio frequency signals are applied to the input cavity device 20 thru a transmission line 22, which is shown schematically in the drawing, and a probe or loop 24 positioned in the input cavity device 20. Similarly, amplified radio frequency signals are derived from the traveling wave tube 10 thru an output cavity device 30 which is similar to the input cavity device 20, and which has an output transmission line 32, also shown schematically, coupled to it by some suitable means such as a probe or loop 34. Energy in the input cavity device 20 is coupled to an antenna-like element 36, which is also described by Pierce, and which is coupled to the first helix 18 of the wave-guiding structure. Energy in the last helix 18 is coupled to the output cavity device 30 thru a similar antenna-like element 38 coupled to the last helix 18. While the traveling wave tube 10 is shown having a plurality of separate wave-guiding structures or helices 18, it is to be understood that the invention is equally applicable to a traveling wave tube having a single wave-guiding structure or helix. As already mentioned, a traveling wave tube having a plurality of wave-guiding structures or helices is described by Peter in his application mentioned previously. Briefly, the helices are separate from but radio frequency coupled to each other, and are respectively provided with separate direct current operating potentials. Such an arrangement has been found to improve the gain characteristics and efficiency of the traveling wave tube.

The operating potentials for the electron gun structure 14 and the wave-guiding structures or helices 18 are supplied from a source of direct current (D.-C.) operating potential 40 which has its positive terminal connected to a voltage dividing resistor 42 and its negative terminal connected to the common point of reference potential. The helices 18 are respectively connected to different taps 46 which adjustably engage the voltage dividing resistor 42. The taps 46 for the helices 18 are arranged so that the voltages applied to the helices 18 may become increasingly positive in the direction of the collector 16. The collector 16 is connected to the positive terminal of another source of direct current operating potential 48, the negative terminal of which is connected to the common point of reference potential.

In numerous applications utilizing traveling wave tubes, it is desirable that the power gain, that is, the ratio of output to input radio frequency power, of the traveling wave tube remain substantially constant for variations of the radio frequency power applied to the traveling wave tube. For example, with an input power of 10 watts and a power gain of 10, the output power would be 100 watts. If the input power were increased to 15 watts, it might be desirable that the output power derived from the traveling wave tube then become 150 watts, which again corresponds to a power gain of 10. One of the objects of the present invention is to provide a comparator and control device for maintaining the power gain of the traveling wave tube substantially constant. This control device comprises a directional coupler 50, shown schematically in the drawing, coupled to the input transmission line 22, and a directional coupler 52, also shown schematically, coupled to the output transmission line 32. Such couplers 50, 52 may be used with coaxial lines or waveguides, and are known in the art. It is preferred that as little power as possible be coupled by the couplers 50, 52 from the input and output transmission lines 22, 32. A suitable rectifier device 54 is coupled to the input coupler 50, and a suitable rectifier device 56 is coupled to the output coupler 52. The input rectifier device 54 is coupled to one end of an input reference voltage resistor 58, the other end of which is connected to the point of reference potential. The output rectifier device 56 is coupled to one end of an output reference voltage resistor 60, the other end of which is also connected to the point of reference potential. The output reference voltage resistor 60 is provided with a slidable tap 62 which engages resistor 60. With radio frequency power on the input transmission line 22, a D.-C. voltage is developed across the input reference voltage resistor 58, and this voltage is proportional to the power applied to the input cavity device 20. Likewise, with radio frequency power on the output transmission line 32, a D.-C. voltage is developed across the output reference voltage resistor 60, and this voltage is proportional to the power derived from the output cavity device 30. The tap 62 is provided to give the control circuit flexibility, and means for making the initial adjustments of the circuit. A direct current (D.-C.) amplifier 64 is provided, and has its input circuit connected between the tap 62 of the output reference voltage resistor 60 and the junction of the input rectifier device 54 and the input reference voltage resistor 58. The output circuit of the D.-C. amplifier 64 is connected across the voltage dividing resistor 42. The D.-C. amplifier is connected so that if the voltage on the tap 62 is less than the voltage on the input reference voltage resistor 58, both with respect to the point of reference potential, then the correction voltage across the output circuit of the D.-C. amplifier aids the source of potential 40. That is, the end 65 of the voltage dividing resistor 42 remote from the source of potential 40 becomes more positive. On the other hand, if the voltage on the tap 62 is greater than the voltage on the input reference voltage resistor 58, then the correction voltage across the output circuit of the D.-C. amplifier 64 opposes the source of potential 40. That is, the end 65 of the voltage dividing resistor 42 remote from the source of potential 40 becomes less positive. The D.-C. amplifier 64 may be arranged either to provide a correction voltage across its output circuit that varies about a center voltage of zero, or to provide a voltage across the output circuit that varies about some finite center voltage, say 100 volts. In this manner, the voltage across the voltage dividing resistor 42 is varied in accordance with the voltage across the output circuit of the D.-C. amplifier 64. The correction voltage across the output circuit of the D.-C. amplifier 64 varies in accordance with the voltage across its input circuit, and this voltage, in turn, depends upon the difference in voltages on the tap 62 and on the input reference voltage resistor 58. With proper values of resistors and other circuit components, it is possible to provide a continuous control of the traveling wave tube 10 so as to ensure a constant gain thru the traveling wave tube 10.

The following example will illustrate the manner in which the control circuit operates, assuming square law detection by the rectifiers 54 and 56. The assumption of square law detection is made only to simplify the numerical example. Basically, linear detection is just as suitable. Assume that the traveling wave tube 10 is to have a power gain of 100, and that the D.-C. voltage across the input reference voltage resistor 58 is 1 volt for a radio frequency power of 1 watt in the input transmission line 22. The radio frequency power output in the output transmission line 32 would, if the tube provides the power gain of 100, be 100 watts. Assume for a radio frequency power of 100 watts in the output transmission line 32, that the corresponding voltage developed across the output reference voltage resistor 60 is 10 volts, and the voltage between the tap 62 and the point of reference potential is one-tenth of this, or one volt. Under these conditions, the resulting voltage across the input circuit of the D.-C. amplifier 64 is zero. No correction voltage is developed across the output circuit of the D.-C. amplifier 64. Hence, the correction voltage across the output circuit is at the center voltage value, which for the example, is assumed to be zero. With no correction voltage to be applied to the voltage dividing resistor 42, the tube will maintain its power gain of 100. However, if the power in the output transmission line 32 falls, for example, to 98 watts, the voltage on the tap 62 will then be only 0.98 volt, and a difference of 0.02 volt will exist across the input circuit of the D.-C. amplifier 64. This difference voltage is amplified by the D.-C. amplifier 64 and applied to the voltage dividing resistor 42 as a correction voltage in such a manner as to aid the source of potential 40, thus increasing the gain thru the traveling wave tube 10 so that the power developed in the output transmission line 32 approaches 100 watts. On the other hand, if the traveling wave tube 10 develops 101 watts in the output transmission line 32, the voltage on the tap 62 then becomes 1.01 volts, which results in a voltage difference of 0.01 volt across the D.-C. amplifier 64. However, this voltage difference is of such a polarity that the D.-C. amplifier 64 develops a correction voltage across its output circuit which opposes the source of potential 40. Thus, the voltage applied to the traveling wave tube 10 is reduced, and this serves to reduce the gain of the traveling wave tube 10 back to 100. As will be appreciated, the control device, when operating, is constantly producing a different voltage across the input circuit of the D.-C. amplifier 64. However, as will also be appreciated, this voltage difference may be quite small if the gain of the D.-C. amplifier is made sufficiently large, thus providing a gain in the traveling wave tube 10 which is highly stable and quite constant.

Fig. 2 shows another embodiment of the invention. While the embodiment in Fig. 2 is quite similar to the embodiment in Fig. 1, the embodiment shown in Fig. 2 is intended to provide a control device for maintaining the power output of the traveling wave tube 10 substantially constant. The arrangement shown in Fig. 2 is substantially similar to that in Fig. 1, and like reference numerals have been provided for those elements shown in Fig. 2 which are identical to those shown in Fig. 1. The difference in the two arrangements lies in the comparator or control device. The output rectifier device 56 is coupled to the output directional coupler 52, and is also coupled to the output referenece voltage resistor 60 as in Fig. 1. However, in the arrangement in Fig. 2, a source of direct current or D.-C. potential 80 is connected between one side of the input circuit of the D.-C. amplifier 64 and the point of reference potential. The source of reference potential 80 has its positive terminal connected to the D.-C. amplifier 64, and its negative terminal connected to the point of reference potential, such as ground, and provides a fixed or constant reference voltage which is compared with a proper fraction of the voltage developed by the output rectifier device 56 across the output reference voltage resistor 60. The difference in voltage between the reference voltage source 80 and the voltage provided across the output reference voltage resistor 60 by the output rectifier device 56 is applied to the input circuit of the D.-C. amplifier 64. The output circuit of the D.-C. amplifier 64 is connected across the voltage dividing resistor 42 in the manner indicated with regard to Fig. 1. Since the voltage developed across the output reference voltage resistor 60 is compared with the fixed reference voltage provided by the reference voltage source 80, it is not necessary to have the combination of the input directional coupler 50, the input reference voltage resistor 58, and the input rectifier device 54. The D.-C. amplifier 64 is connected so that the correction voltage developed across its output circuit opposes the voltage of the operating source 40 if the voltage on the tap 62 exceeds the reference voltage, and so that the correction voltage developed across its output circuit aids the voltage of the operating source 40 if the voltage on the tap 62 is less than the reference voltage. The reference voltage source 80 provides a standard reference voltage against which the voltage across the output reference voltage resistor 60 may be compared so as to maintain the output power level of the traveling wave tube 10 substantially constant. From the explanation given in connection with Fig. 1, it will be seen that whenever the voltage across the output reference voltage resistor 60 deviates from the reference voltage, the difference voltage will be applied to the input circuit of the D.-C. amplifier 64, amplified, and applied to the voltage dividing resistor 42 so as to increase or decrease the gain of the traveling wave tube 10 in the direction necessary to bring its power output back to the predetermined level. The tap 62 on resistor 60 is provided so as to allow the input power level to be set to the desired value.

What is claimed is:

1. The combination of a traveling wave tube and control means therefor, said traveling wave tube having input means, output means, and a plurality of spaced helices positioned end-to-end between said input and said output means, said input means being coupled to the first of said helices, said output means being coupled to the last of said helices, and said control means comprising a first rectifier and resistor network coupled to said output means for producing a first voltage whose magnitude is proportional to the power of an output signal derived from said output means, a second rectifier and resistor network coupled to said input means for producing a second voltage whose magnitude is proportional to the power of an input signal applied to said input means, comparator means coupled to said first network and to said second network for comparing said first and said second voltages and producing a resultant voltage having a polarity and magnitude proportional to the relative difference between said first and said second voltages, and separate connections coupled between the output of said comparator and each of said helices for applying said resultant voltage to said helices, thereby controlling the voltage applied to said helices.

2. The combination of a traveling wave tube and control means therefor, said traveling wave tube having input means, output means, and a plurality of spaced helices positioned end-to-end between said input and said output means, said input means being coupled to the first of said helices, said output means being coupled to the last of said helices, and said control means comprising a first rectifier and resistor network coupled to said output means for producing a first voltage whose magnitude is proportional to the power of an output signal derived from said output means, means for producing a reference voltage to be compared with said first voltage, comparator means coupled to said first network and to said reference voltage producing means for comparing said first voltage and said reference voltage and producing a resultant voltage having a polarity and magnitude proportional to the relative difference between said first voltage and said reference voltage, and separate connections coupled between the output of said comparator and each of said helices for applying said resultant voltage to said helices, thereby controlling the voltage applied to said helices.

3. The combination of a traveling wave tube and control means therefor, said traveling wave tube having input means, output means, and a plurality of spaced, radio frequency coupled wave-guiding means positioned end-to-end between said input and said output means, said input means being coupled to the first of said wave-guiding means, said output means being coupled to the last of said wave-guiding means, and said control means comprising a first rectifier and resistor network coupled to said output means for producing a first voltage whose magnitude is proportional to the power of an output signal derived from said output means, a second rectifier and resistor network coupled to said input means for producing a second voltage whose magnitude is proportional to the power of an input signal applied to said input means, comparator means coupled to said first network and to said second network for comparing said first and said second voltages and producing a resultant voltage at the output of said comparator means having a polarity and magnitude proportional to the relative difference between said first and said second voltages, a voltage dividing network connected across said output of said comparator, and separate connections coupled between different points on said voltage dividing network and said wave-guiding means for applying said resultant voltage to said wave-guiding means, thereby controlling the voltage applied to said wave-guiding means.

4. The combination of a traveling wave tube and control means therefor, said traveling wave tube having input means, output means, and a plurality of spaced, radio frequency coupled wave-guiding means positioned end-to-end between said input and said output means, said input means being coupled to the first of said wave-guiding means, said output means being coupled to the last of said wave-guiding means, and said control means comprising a first rectifier and resistor network coupled to said output means for producing a first voltage whose magnitude is proportional to the power of an output signal derived from said output means, means for producing a reference voltage to be compared with said first voltage, comparator means coupled to said first network and to said reference voltage producing means for comparing said first voltage and said reference voltage and producing a resultant voltage at the output of said comparator means having a polarity and magnitude proportional to the relative difference between said first voltage and said reference voltage, a voltage dividing network connected across said output of said comparator, and separate connections coupled between different points on said voltage dividing network and each of said wave-guiding means for applying said resultant voltage to said wave-guiding means, thereby controlling the voltage applied to said wave-guiding means.

5. A combination as claimed in claim 4 and wherein said reference voltage producing means includes a source of direct current potential, said comparator means including a direct current amplifier having inputs coupled to said source and to said first network.

References Cited in the file of this patent

UNITED STATES PATENTS

| 2,390,250 | Hansell | Dec. 4, 1945 |
| 2,460,498 | Glinzton | Feb. 1, 1949 |
| 2,611,832 | Lapostolle | Sept. 23, 1952 |
| 2,738,439 | Hornbuckle | Mar. 13, 1956 |